Oct. 8, 1946.                 D. F. WARNER                 2,408,836
                          BAROMETRIC FUEL VALVE
                          Filed April 12, 1944
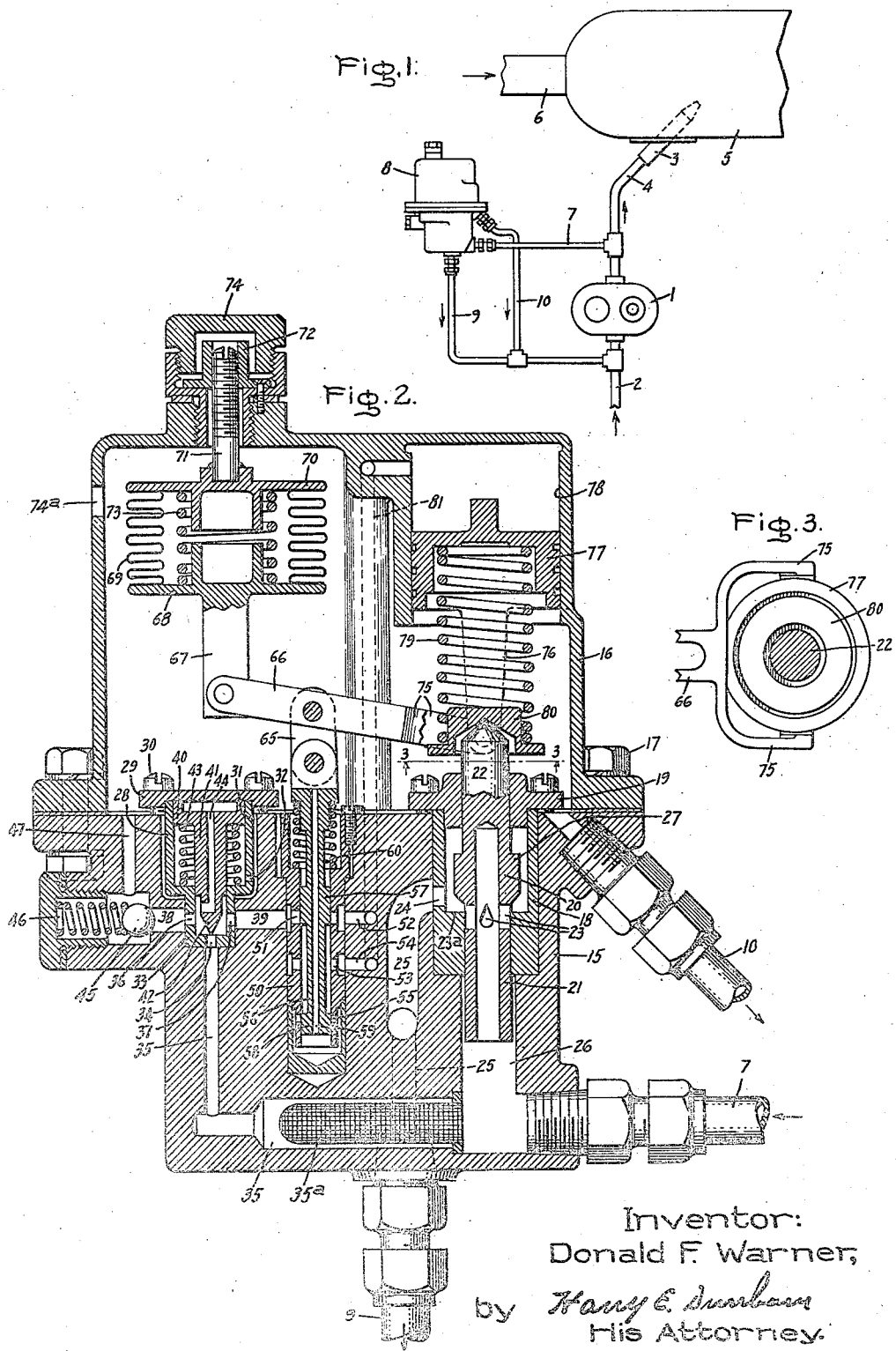
Inventor:
Donald F. Warner,
by Harry E. Dunham
His Attorney.

Patented Oct. 8, 1946

2,408,836

UNITED STATES PATENT OFFICE 2,408,836

BAROMETRIC FUEL VALVE

Donald F. Warner, Swampscott, Mass., assignor to General Electric Company, a corporation of New York Application April 12, 1944, Serial No. 530,718

2 Claims. (Cl. 137—153)

In connection with fuel systems used to supply liquid fuel to certain types of aircraft power plants, it is known to provide a barometric fuel valve for by-passing fuel from the discharge side of the fuel pump to the fuel tank, the arrangement being such that the amount of fuel by-passed increases and decreases with increase and decrease in altitude. The purpose of this is to regulate automatically the amount of fuel supplied to the power plant with changes in altitude.

The object of my invention is to provide an improved construction and arrangement of barometric fuel valve for use in such a fuel system, and for a consideration of what I believe to be novel and my invention, attention is directed to the following specification and to the claims appended thereto.

In the drawing, Fig. 1 is a diagrammatic view of a part of a fuel system in connection with which my improved barometric value may be used; Fig. 2 is a sectional view on an enlarged scale of the improved barometric valve, and Fig. 3 is a detail sectional view taken on line 3—3, Fig. 2.

Referring to the drawing, 1 indicates a constant displacement fuel pump which may be driven from an aircraft power plant and which takes fuel from a fuel tank through a suction line 2 and delivers it to a fuel nozzle 3 through a pressure pipe line 4. Fuel nozzle 3 is shown as supplying fuel to a combustion chamber 5 to which air is supplied by a conduit 6. Connected to pressure pipe 4 is a by-pass pipe line 7 which leads to a barometric fuel valve 8 and from which pipe lines 9 and 10 lead back to suction pipe line 2, i. e., to the fuel tank. The foregoing arrangement is shown only in outline and is to be taken as typical of any power plant fuel system in connection with which it is desired to use a barometric fuel valve.

Referring to Fig. 2, the improved barometric fuel valve comprises a base 15 to which is attached a cap 16 by means of a ring of studs 17. In base 15 is a well in which is located a cylindrical valve casing 18 held in place by a head 19. In valve casing 18 is a control valve member 20 having a downwardly projecting stem 21 and an upwardly projecting stem 22. Stem 21 is hollow and is provided with valve ports 23 which are covered and uncovered by the adjacent wall 23ª of the valve casing. Valve casing 18 is provided with a discharge opening 24 which communicates with a discharge passage 25 in the base with which by-pass pipe line 9 is connected.

The passage in stem 21 communicates with an inlet chamber 26 in the lower end of base 15 and with which by-pass conduit 7 connects. With this arrangement, it will be seen that liquid fuel can flow from pipe 7 to chamber 26, thence through valve ports 23 and opening 24 to discharge passage 25 and by-pass pipe 9. The volume of liquid fuel which may flow depends upon the position of ports 23 with respect to the adjacent edge of wall 23ª. Movable valve member 20 controls the flow of fuel under pressure from by-pass pipe line 7 to discharge pipe line 9. On valve member 20 is a collar 27 which forms a stop to limit upward travel of the valve member.

In base 15 is a second well in which is located a cylinder 28 covered by head 29 held in place by studs 30. The upper end of cylinder 28 projects above the top surface of base 15 whereby head 29, at its edges, is spaced from the surface of base 15. Cylinder 28 fits loosely in its well, leaving a space 31 which space is connected with the interior of the cylinder by one or more passages 32. The lower end of cylinder 28 is provided with an extension 33 of a diameter smaller than the main cylinder which seats in a recess in base 15 and in the bottom wall of this extension is an opening 34 connected by a passage 35 to inlet chamber 26. In passage 35 is a suitable strainer 35ª. In the side wall of extension 33 are ports 36 and 37 which communicate respectively with passages 38 and 39 in base 15.

In cylinder 28 is a piston 40 having a stem 41 on the lower end of which is a needle valve 42 which controls flow of liquid through opening 34. Located between the underside of piston 40 and the lower end of cylinder 28 is a spring 43 which serves to bias piston 40 toward the top of the cylinder and needle valve 42 away from passage 34. Extending through stem 41 is a passage 44 which connects the space surrounding needle valve head 42 with the space between the upper end of piston 40 and cylinder head 29.

Passage 38 communicates with a chamber in which is located a ball pressure relief valve 45 held against the end of passage 38 by a spring 46. The chamber in which relief valve 45 is located is connected by a passage 47 to the space above base 15. Piston 40, spring 43 and needle valve head 42 form a pressure reducing valve, the operation of which is explained hereinafter.

Passage 39 communicates with a well in base 15 in which is located a pilot valve liner 50. In the pilot valve liner are ports 51 which communicate with passages 39 and 37 and with a third passage 52; ports 53 which communicate with a passage 54, and ports 55 which communicate with the space at the lower end of the liner.

In the pilot valve liner is a pilot valve comprising a stem 56 provided with pilot valve heads 57 and 58 which control the ports 51 and 55 respectively. Stem 56 is provided with a longitudinally extending passage 59 which connects the space at the lower end of the cylinder liner with the space inside cap 16 above base 15. Surrounding the upper end of pilot valve stem 56 is a spring 60 which biases the pilot valve in an upward direction.

The upper end of the pilot valve stem is pivotally connected by a link 65 to an intermediate point of a lever 66. The left hand end of lever 66 is pivoted to a stem 67 on the lower movable head 68 of a corrugated bellows 69. The upper stationary head 70 of the corrugated bellows is provided with a threaded stem 71 which projects out through an opening in cap 16 and receives on its outer end an adjusting nut 72. By turning nut 72, the stationary head 70 may be adjusted vertically. Inside corrugated bellows 69 and engaging heads 68 and 70 is a coiled spring 73 which acts in a direction to separate the two heads. The bellows 69 is evacuated. The end of stem 71 and adjusting nut 72 are covered by a cap 74. The interior of cap 16 is connected to atmosphere through an opening 74$^a$. Thus the corrugated bellows on its exterior is subjected at all times to ambient pressure.

The other end of lever 66 is forked to provide a pair of furcations 75 which are pivoted on the lower ends of depending arms 76 formed integral with and projecting downwardly from the skirt of a piston 77. Piston 77 is located in a cylinder 78 formed in the upper end of cap 16. Located between the underside of piston 77 and stem 22 is a compression spring 79. The lower end of the compression spring engages a spring holder 80 which has a cone-shaped under surface resting on a pointed end on stem 22. Spring 79 forms the sole connection between piston 77 and stem 22. It serves to spring load control valve member 20. Cylinder 78 above piston 77 is connected by a passage 81 to passages 52 and 54. Thus the piston structure is connected to the pilot valve structure comprising pilot valve heads 57 and 58.

The operation is as follows: When pump 1 is operating, it supplies fuel oil under pressure to fuel nozzle 3 and a certain amount of such fuel oil is by-passed through pipe line 7, depending upon the position of valve ports 23 in control valve member 20. Fuel oil from the discharge side of the pump flowing through pipe line 7 enters chamber 26 at substantially the same pressure as that which obtains on the discharge side of the pump. The fuel oil from the chamber 26 is discharged through valve ports 23 and opening 24 to discharge pipe line 9. The purpose of the barometric valve is to effect a flow of oil through it which increases with altitude at a rate such as to regulate automatically the pressure on the discharge side of pump 1 and thus the amount of fuel supplied to the power plant with changes in altitude. To this end spring 79 is adjusted to vary the spring loading of control valve member 20, whereby the valve member functions to vary the pressure on the discharge side of pump 1.

The setting of spring 79 is adjusted by piston 77. As a source of actuating fluid pressure for the piston, I utilize fuel oil from chamber 26. From chamber 26, fuel oil flows through strainer 35$^a$ and passage 35, opening 34 and passage 44 to the space above piston 40. There is thus built up a pressure in the space above piston 40 which serves to force the piston downward and bring needle valve head 42 to a position wherein the pressure in the space above piston 40 balances the spring pressure. Needle valve 42 acts as a reducing valve and is positioned to reduce the pressure supplied to the pilot valve to a value suitable for operating piston 77. Normally, the pilot valve occupies a position as shown in Fig. 2. Bellows 69 is subjected to atmospheric pressure. When the atmospheric pressure decreases, the corrugated bellows is distended due to the action of spring 73, thus lowering the pilot valve. Lowering the pilot valve permits fluid to escape from cylinder 78 through passage 81, passage 54, pilot valve openings 53 and 55 and passage 59 through the pilot valve stem to the space above base 15. As a result, piston 77 moves upwardly in cylinder 78, thus decreasing the compression of spring 79 to set it so that the control valve is set to hold a lower pressure on the discharge side of pump 1. As a result, valve member 20 moves upwardly to uncover further passages 23, permitting an increase in the amount of fuel oil by-passed through pipe line 7.

In this connection, it will be seen that valve member 20 is subjected to the fuel oil pressure on its lower side and to the pressure of spring 79 on its upper side and for any setting of spring 79 positions itself to establish a pressure on the discharge side of pump 1 which balances the spring pressure. When the atmospheric pressure increases, the bellows is collapsed thus lifting the pilot valve to supply fuel pressure from passage 39 through passage 81 to cylinder 78, effecting a downward movement of piston 77 to increase the compression of spring 79 and effect a closing movement of valve member 20. This serves to decrease the amount of fuel oil by-passed.

Check valve 45 functions to limit the maximum pressure which can obtain on the downstream side of the reducing valve 42.

Passage 47, space 31 and passage 59 all communicate with the space within cap 16 above base 15. The fuel oil discharged through passages 47 and 59 and space 31 flows out through pipe line 10.

By my invention, I provide a barometric valve structure which is relatively simple in design, compact, reliable in operation and one in which the fuel oil being by-passed is, after being suitably reduced in pressure, used for effecting the positioning of the control valve.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A barometric valve structure of the character described comprising a base, a cap fixed on the base to provide a chamber above the base, a pressure control valve in the base having a stem projecting into said chamber, a cylinder in the cap, a piston in the cylinder, a loading spring between the piston and the valve stem, walls which define a passage connecting the region on the admission side of said control valve to said cylinder, a pressure reducing valve in said passage, a pilot valve in the passage beyond said reducing valve which controls flow of fluid to said cylinder, and a means responsive to barometric pressure for positioning said pilot valve.

2. A barometric valve structure of the character described comprising a base, a cap fixed on the base to provide a chamber above the base, a pressure control valve in the base having a stem projecting into said chamber, a cylinder in the cap, a piston in the cylinder, a loading spring between the piston and the valve stem, walls which define a passage connecting the region on the admission side of said control valve to said cylinder, a pressure reducing valve in said passage, a pilot valve in the passage beyond said reducing valve which controls flow of fluid to said cylinder and has a stem which projects into said chamber, a lever in said chamber connected to said pilot valve stem, and a means responsive to barometric pressure connected to said lever for positioning said pilot valve.

DONALD F. WARNER.